(12) United States Patent
Nakamura et al.

(10) Patent No.: US 11,398,711 B2
(45) Date of Patent: Jul. 26, 2022

(54) MULTICORE OPTICAL FIBER AMPLIFIER AND OPTICAL AMPLIFICATION METHOD USING MULTICORE OPTICAL FIBER AMPLIFICATION MEDIUM

(71) Applicant: NEC Corporation, Tokyo (JP)

(72) Inventors: Shigeru Nakamura, Tokyo (JP); Emmanuel Le Taillandier De Gabory, Tokyo (JP); Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 16/479,631

(22) PCT Filed: Jan. 19, 2018

(86) PCT No.: PCT/JP2018/001602
§ 371 (c)(1),
(2) Date: Jul. 22, 2019

(87) PCT Pub. No.: WO2018/135621
PCT Pub. Date: Jul. 26, 2018

(65) Prior Publication Data
US 2021/0359485 A1  Nov. 18, 2021

(30) Foreign Application Priority Data

Jan. 23, 2017 (JP) .............................. JP2017-009725

(51) Int. Cl.
*H01S 3/067* (2006.01)
*G02B 6/02* (2006.01)
*H01S 3/16* (2006.01)

(52) U.S. Cl.
CPC ...... *H01S 3/06754* (2013.01); *G02B 6/02042* (2013.01); *H01S 3/06737* (2013.01); *H01S 3/1608* (2013.01)

(58) Field of Classification Search
None
See application file for complete search history.

(56) References Cited

U.S. PATENT DOCUMENTS

2015/0078744 A1* 3/2015 Ito ................... H04B 10/2581
398/43
2015/0085352 A1* 3/2015 Ryf ...................... H01S 3/1003
359/341.33

(Continued)

FOREIGN PATENT DOCUMENTS

JP  5-206557 A  8/1993
JP  2012-109653 A  6/2012

(Continued)

OTHER PUBLICATIONS

International Search Report for PCT/JP2018/001602 dated Apr. 17, 2018 [PCT/ISA/210].

(Continued)

*Primary Examiner* — Eric L Bolda

(57) ABSTRACT

A multicore optical fiber amplifier according to an exemplary aspect of the present invention includes a multicore optical fiber amplification medium including, in a clad, a plurality of cores doped with a rare earth element; signal light introduction means for introducing, into each of the plurality of cores, signal light with a wavelength included in a gain band of the multicore optical fiber amplification medium; excitation light introduction means for introducing, into the clad, excitation light for exciting the multicore optical fiber amplification medium; and control light introduction means for introducing control light into each of the plurality of cores, wherein the control light introduction means introduces the control light into a non-signal core into which the signal light is not being introduced, among the plurality of cores, only when the excitation light is being introduced.

10 Claims, 7 Drawing Sheets

(56) References Cited

U.S. PATENT DOCUMENTS

| | | | |
|---|---|---|---|
| 2015/0222356 A1* | 8/2015 | Kawanishi | H04J 14/00 |
| | | | 398/43 |
| 2015/0229438 A1 | 8/2015 | Le Taillandier de Gabory et al. | |
| 2019/0140418 A1* | 5/2019 | Le Taillandier De Gabory | ........... |
| | | | H01S 3/09415 |
| 2019/0221987 A1* | 7/2019 | Le Taillandier De Gabory | ........... |
| | | | H01S 3/094069 |

FOREIGN PATENT DOCUMENTS

| | | |
|---|---|---|
| JP | 2015-95808 A | 5/2015 |
| JP | 2015-167158 A | 9/2015 |
| JP | 2016-127241 A | 7/2016 |
| JP | 2016-219753 A | 12/2016 |
| JP | 2016-220163 A | 12/2016 |
| WO | 2013/179604 A1 | 12/2013 |

OTHER PUBLICATIONS

Japanese Office Action far JP Application No. 2018-562449 dated Mar. 8, 2022 with English Translation.

* cited by examiner

MULTICORE OPTICAL FIBER AMPLIFIER AND OPTICAL AMPLIFICATION METHOD USING MULTICORE OPTICAL FIBER AMPLIFICATION MEDIUM

CROSS REFERENCE TO RELATED APPLICATIONS

This application is a National Stage of International Application No. PCT/JP2018/001602, filed on Jan. 19, 2018, which claims priority from Japanese Patent Application No. 2017-009725, filed on Jan. 23, 2017, the contents of all of which are incorporated herein by reference in their entirety.

TECHNICAL FIELD

The present invention relates to multicore optical fiber amplifiers and optical amplification methods using multicore optical fiber amplification media and, in particular, to a multicore optical fiber amplifier and an optical amplification method using a multicore optical fiber amplification medium that are used for an optical communication system or an optical interconnect system.

BACKGROUND ART

In an optical fiber communication system, in order to cope with expansion of a communication capacity, technologies for time-multiplexing or wavelength-multiplexing optical signals transmitted through a core of an optical fiber have been researched and developed. These days, a limit of optical signal power for each core is becoming actual, and an approach to a spatial multiplexing technology is being intensified to further expand the communication capacity.

The spatial multiplexing technology uses a multicore optical fiber in which a plurality of cores are formed in a clad. Transmitting optical signals through each of the plurality of cores enables a signal transmission capacity with respect to each optical fiber to increase.

In order to make an optical communication system using a multicore optical fiber, an optical amplifier suitable for a multicore optical fiber is required. Examples proposed as such an optical amplifier include an optical amplifier in which optical excitation is performed with a rare-earth element such as erbium (Er) doped in a plurality of cores of a multicore optical fiber. Examples of an excitation method for optically exciting a plurality of cores with an amplification medium doped include a core excitation method in which excitation light is individually inputted into each core, and a clad excitation method in which a plurality of cores are optically excited together with excitation light inputted into a clad. The clad excitation method makes it possible to use a single excitation light source and suppress heat generation by expanding the width of a light emitting section, which is caused by making a transverse mode of excitation light a multimode. This makes it possible to fabricate an optical amplifier with low electric power consumption.

Patent Literature 1 discloses an example of a multicore optical fiber amplifier in which the above-mentioned clad excitation method is used with the core excitation method. A related multicore optical fiber amplifier described in Patent Literature 1 includes an amplification multicore fiber, a clad excitation section, a core excitation section, and a gain equalizer.

The amplification multicore fiber is configured in a double-clad structure and includes a plurality of cores doped with erbium ions. The clad excitation section is placed between the amplification multicore fiber and a first transmission multicore fiber connected to an input end of the multicore optical fiber amplifier. The core excitation section is placed between the amplification multicore fiber and a second transmission multicore fiber connected to an output end of the multicore optical fiber amplifier. The gain equalizer is placed between the core excitation section and the second transmission multicore fiber, and flattens the gain.

In the related multicore optical fiber amplifier, the clad excitation section mainly excites wavelength division multiplexing (WDM) signals. The excitation light is compensated for by controlling a core excitation light source independently in each of the core excitation sections in such a way as to correspond to wavelength dependence of output power and gain that arises due to a change in the number of WDM signals to be inputted into each core of the amplification multicore fiber. It is said that the related multicore optical fiber amplifier with above-described configuration can achieve gain flatness.

As the related technologies, there are technologies described in Patent Literature 2 and Patent Literature 3

CITATION LIST

Patent Literature

[PTL 1] Japanese Unexamined Patent Application Publication No. 2016-219753
[PTL 2] Japanese Unexamined Patent Application Publication No. H5-206557
[PTL 3] Japanese Unexamined Patent Application Publication No. 2016-127241

SUMMARY OF INVENTION

Technical Problem

In a transmission line using a multicore optical fiber, signal light is not always inputted into all cores. Accordingly, it could be that signal light is inputted into only one part of the plurality of cores, and that signal light is not inputted into the other cores, resulting in a non-signal-light state. In this case, in a multicore optical fiber amplifier based on the clad excitation method in which a plurality of cores are optically excited together with excitation light inputted into a clad, strong population inversion is formed because stimulated emission due to signal light does not arise without signal light.

A case will be described with reference to FIG. 7A and FIG. 7B where signal light is inputted with the strong population inversion formed in an optical fiber amplifier. When signal light having an input waveform as illustrated in FIG. 7A is inputted into the optical fiber amplifier in which strong population inversion is formed, an optical pulse having an extremely large optical intensity arises for some hundreds of microseconds (μs) as illustrated in FIG. 7B. Such an optical pulse is called an optical surge. When the optical surge occurs, an optical component and an optical receiver are damaged that are positioned on the output side of the optical fiber amplifier.

If the input of the excitation light is started after the input of the signal light, an optical surge does not occur because strong population inversion is not formed. In other words, the input of the excitation light is once stopped, signal light is newly inputted into a core into which signal light is not inputted, and then the input of the excitation light is restarted; consequently, an optical surge does not occur. However, if a plurality of cores are optically excited together with the excitation light inputted into a clad, the gain in the core into which the signal light has already been inputted also largely fluctuates due to such an operation for changing the excitation light intensity.

As described above, there is the problem that, in a multicore optical fiber amplifier based on a clad excitation method, it is difficult to suppress the occurrence of an optical surge due to input of signal light into a core with no signal light, without the occurrence of fluctuation in the gain of a core into which signal light is inputted.

The object of the present invention is to provide a multicore optical fiber amplifier and an optical amplification method using a multicore optical fiber amplification medium that solve the above-mentioned problem.

Solution to Problem

A multicore optical fiber amplifier according to an exemplary aspect of the present invention includes a multicore optical fiber amplification medium including, in a clad, a plurality of cores doped with a rare earth element; signal light introduction means for introducing, into each of the plurality of cores, signal light with a wavelength included in a gain band of the multicore optical fiber amplification medium; excitation light introduction means for introducing, into the clad, excitation light for exciting the multicore optical fiber amplification medium; and control light introduction means for introducing control light into each of the plurality of cores, wherein the control light introduction means introduces the control light into a non-signal core into which the signal light is not being introduced, among the plurality of cores, only when the excitation light is being introduced.

An optical amplification method using a multicore optical fiber amplification medium according to an exemplary aspect of the present invention includes introducing signal light into at least one of a plurality of cores, the signal light having a wavelength included in a gain band of the multicore optical fiber amplification medium including, in a clad, the plurality of cores doped with a rare earth element; generating excitation light to be introduced into the clad in order to excite the multicore optical fiber amplification medium; generating control light to be introduced into the plurality of cores; and introducing the control light into a non-signal core into which the signal light is not being introduced, among the plurality of cores, only when the excitation light is being introduced.

Advantageous Effects of Invention

According to the multicore optical fiber amplifier of the present invention, it is possible, even when a clad excitation method is used, to suppress the occurrence of an optical surge due to input of signal light into a core with no signal light, without the occurrence of fluctuation in the gain of a core into which signal light is inputted.

According to the optical amplification method using a multicore optical fiber amplification medium of the present invention, it is possible, even when a clad excitation method is used, to suppress the occurrence of an optical surge due to input of signal light into a core with no signal light, without the occurrence of fluctuation in the gain of a core into which signal light is inputted.

EXAMPLE EMBODIMENT

Example embodiments of the present invention will be described below with reference to the drawings.

First Example Embodiment

Figure 1:
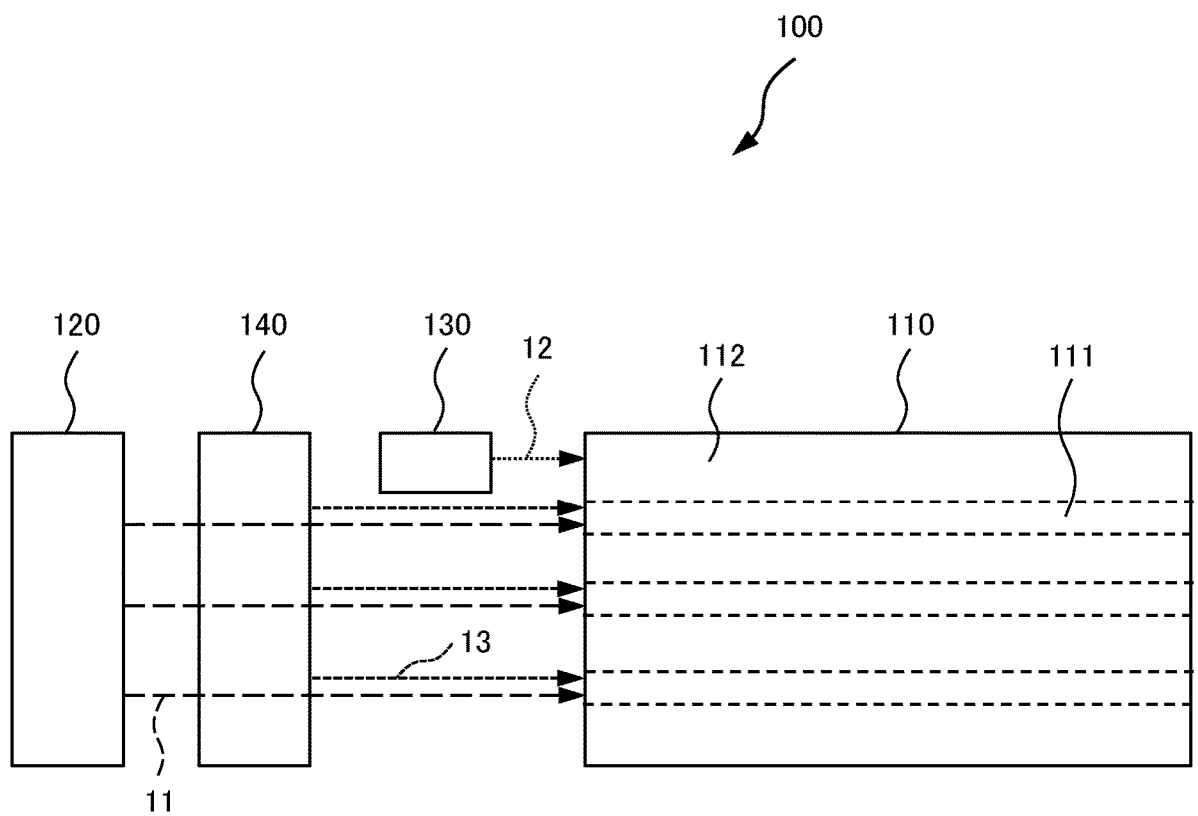
FIG. 1 is a block diagram illustrating a configuration of a multicore optical fiber amplifier according to a first example embodiment of the present invention.

FIG. 1 is a block diagram illustrating a configuration of a multicore optical fiber amplifier 100 according to a first example embodiment of the present invention.

The multicore optical fiber amplifier 100 includes a multicore optical fiber amplification medium 110, a signal light introduction section (signal light introduction means) 120, an excitation light introduction section (excitation light introduction means) 130, and a control light introduction section (control light introduction means) 140.

The multicore optical fiber amplification medium 110 includes, in a clad 112, a plurality of cores 111 doped with a rare earth element. Erbium (Er) can be typically used as the rare earth element. This enables the multicore optical fiber amplification medium 110 to amplify signal light with a wavelength in the 1.55 micrometer (μm) band used in an optical communication system. The clad 112 can have a double clad structure in which the clad is double-layered.

The signal light introduction section 120 is configured to introduce, into each of the plurality of cores 111, signal light 11 with a wavelength included in the gain band of the multicore optical fiber amplification medium 110.

The excitation light introduction section 130 is configured to introduce, into the clad 112, excitation light 12 for exciting the multicore optical fiber amplification medium 110. When the cores 111 are doped with erbium (Er) as a rare earth element, laser light with a wavelength of 0.98 micrometers (μm) or 1.48 micrometers (μm) can be used as the excitation light 12.

The control light introduction section 140 is configured to introduce control light 13 into each of the plurality of cores 111. Only when the excitation light 12 is being introduced, the control light introduction section 140 introduces the control light 13 into a non-signal core into which the signal light 11 is not being introduced, among the plurality of cores 111.

As described above, in the multicore optical fiber amplifier 100 according to the present example embodiment, the control light 13 is introduced into the non-signal core only when the excitation light 12 is being introduced. Consequently, the control light 13 is amplified, which makes it possible to avoid having strong population inversion due to the excitation light 12 formed. At this time, the gain of a signal core into which the signal light 11 is being introduced among the plurality of cores 111 does not fluctuate because the excitation light 12 is being introduced.

As mentioned above, according to the multicore optical fiber amplifier 100 of the present example embodiment, it is possible, even when a clad excitation method is used, to suppress the occurrence of an optical surge due to input of signal light into a core with no signal light, without the occurrence of fluctuation in the gain of a core into which signal light is inputted.

Next, an optical amplification method using a multicore optical fiber amplification medium according to the present example embodiment will be described.

In the optical amplification method using a multicore optical fiber amplification medium of the present example embodiment, first, signal light is introduced into at least one of a plurality of cores, and the signal light has a wavelength included in the gain band of a multicore optical fiber amplification medium including, in a clad, a plurality of cores doped with a rare earth element. In order to excite the multicore optical fiber amplification medium, excitation light to be introduced into the clad is generated. Control light to be introduced into the plurality of cores is generated. Only when the excitation light is being introduced, the control light is introduced into a non-signal core into which the signal light is not being introduced, among the plurality of cores.

As mentioned above, according to the optical amplification method using a multicore optical fiber amplification medium of the present example embodiment, it is possible, even when a clad excitation method is used, to suppress the occurrence of an optical surge due to input of signal light into a core with no signal light, without the occurrence of fluctuation in the gain of a core into which signal light is inputted.

Second Example Embodiment

Figure 2:
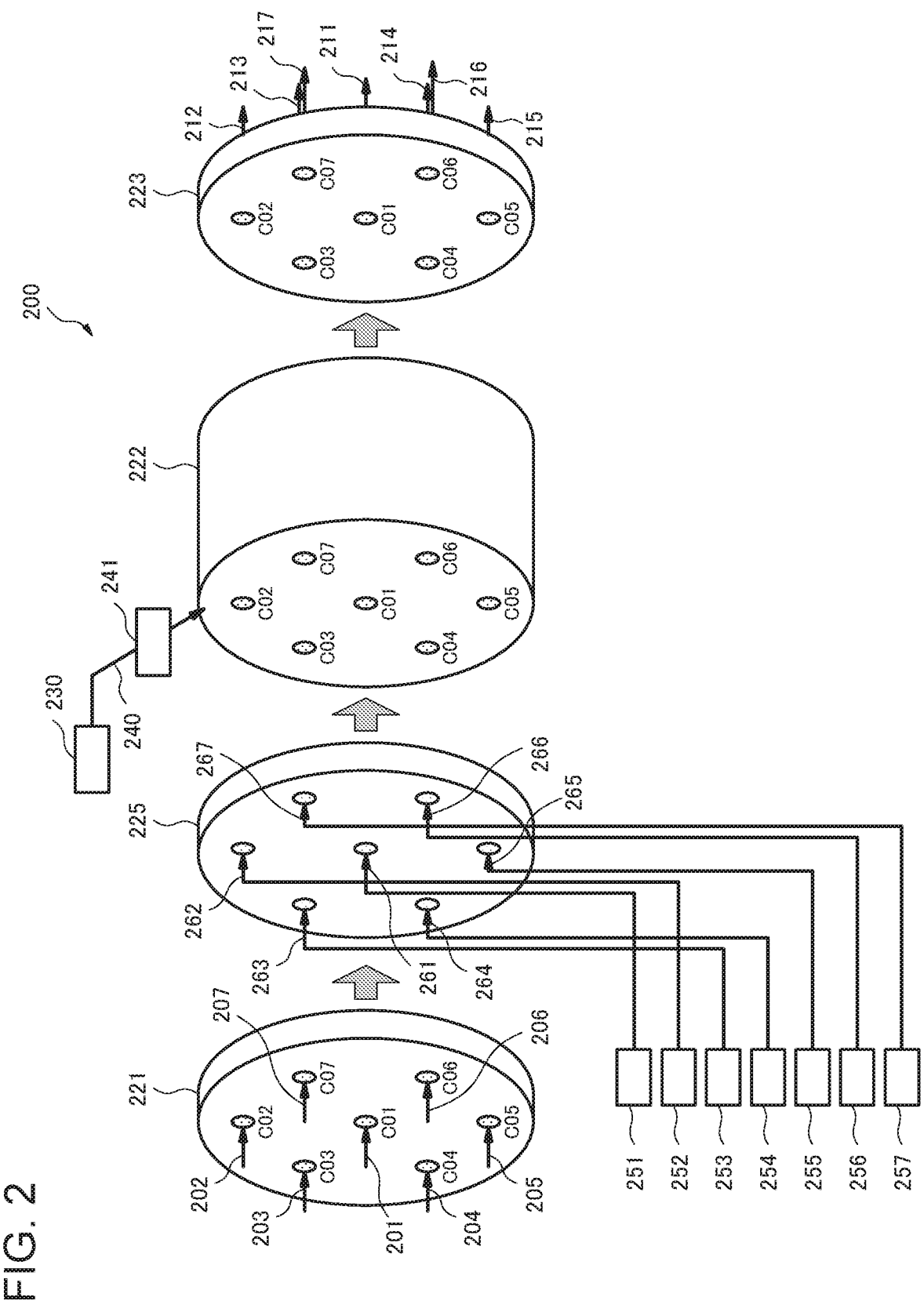
FIG. 2 is a block diagram illustrating a configuration of a multicore optical fiber amplifier according to a second example embodiment of the present invention.

Next, a second example embodiment of the present invention will be described. FIG. 2 illustrates a configuration of a multicore optical fiber amplifier 200 according to the second example embodiment of the present invention.

The multicore optical fiber amplifier 200 according to the present example embodiment includes an amplification optical fiber 222 serving as a multicore optical fiber amplification medium, a clad excitation introduction section 241 serving as an excitation light introduction means, a signal light introduction section 221, and a dummy light introduction section 225 serving as a control light introduction means.

In an example illustrated in FIG. 2, the amplification optical fiber 222 has a configuration in which a multicore optical fiber including seven cores C01 to C07, for example, is doped with a rare earth element. As the rare earth element, erbium (Er) can be typically used. This enables the amplification optical fiber 222 to amplify signal light with a wavelength in the 1.55 micrometers (μm) band used in an optical communication system.

The clad excitation introduction section 241 inputs, into a clad of the amplification optical fiber 222, clad excitation light 240 output from a clad excitation light source 230. The signal light introduction section (signal light introduction means) 221 inputs signal light beams 201 to 207 into the respective cores of the amplification optical fiber 222. The dummy light introduction section 225 inputs, into the respective cores, dummy light 261 to 267 output from dummy light sources 251 to 257. The wavelength of the dummy light (control light) is included in the gain band of the amplification optical fiber 222.

As each of the clad excitation introduction section 241 and the dummy light introduction section 225, an optical multiplexer such as an optical fiber coupler can be typically used.

The multicore optical fiber amplifier 200 according to the present example embodiment is configured to further include a signal light output section 223 for outputting, from the respective cores, after-propagation signal light beams 211 to 217 each of which is signal light after having been propagated through the amplification optical fiber 222.

Next, the operation of the multicore optical fiber amplifier 200 according to the present example embodiment will be described. Here, a case will be described as an example where the signal light beams 201 to 206 are being inputted into the multicore optical fiber amplifier 200, but the signal light beam 207 is not being inputted, that is, the core C07 is in a state of no signal light.

The multicore optical fiber amplifier 200 puts the excitation light source 230 into an on-state, and the excitation light 240 is inputted into the clad of the amplification optical fiber 222. This optical excitation causes the signal light beams 201 to 206 to be amplified. The dummy light beams 261 to 267 are inputted into the cores C01 to C07 from the dummy light sources 251 to 257. This makes the dummy light beam 267 from the dummy light source 257 inputted into the core C07 with no signal light, and amplified; therefore, it is possible to avoid having strong population inversion formed. This makes it possible to suppress the production of the optical surge effect when it is started in this state to input the signal light beam 207 into the core C07.

At this time, each gain of the cores C01 to C06 into which the signal light beams 201 to 206 are being introduced does not fluctuate because the excitation light 240 is being introduced.

As described above, the multicore optical fiber amplifier 200 according to the present example embodiment avoids forming a strong population inversion state by using the dummy light when the signal light is inputted into the core with no signal light, with the plurality of cores excited together by the excitation light inputted into the clad. This causes the optical surge effect to be suppressed. That is to say, according to the multicore optical fiber amplifier 200 of the present example embodiment, it is possible, even when a clad excitation method is used, to suppress the occurrence of an optical surge due to input of signal light into a core with no signal light, without the occurrence of fluctuation in the gain of a core into which signal light is inputted.

Third Example Embodiment

Figure 3:
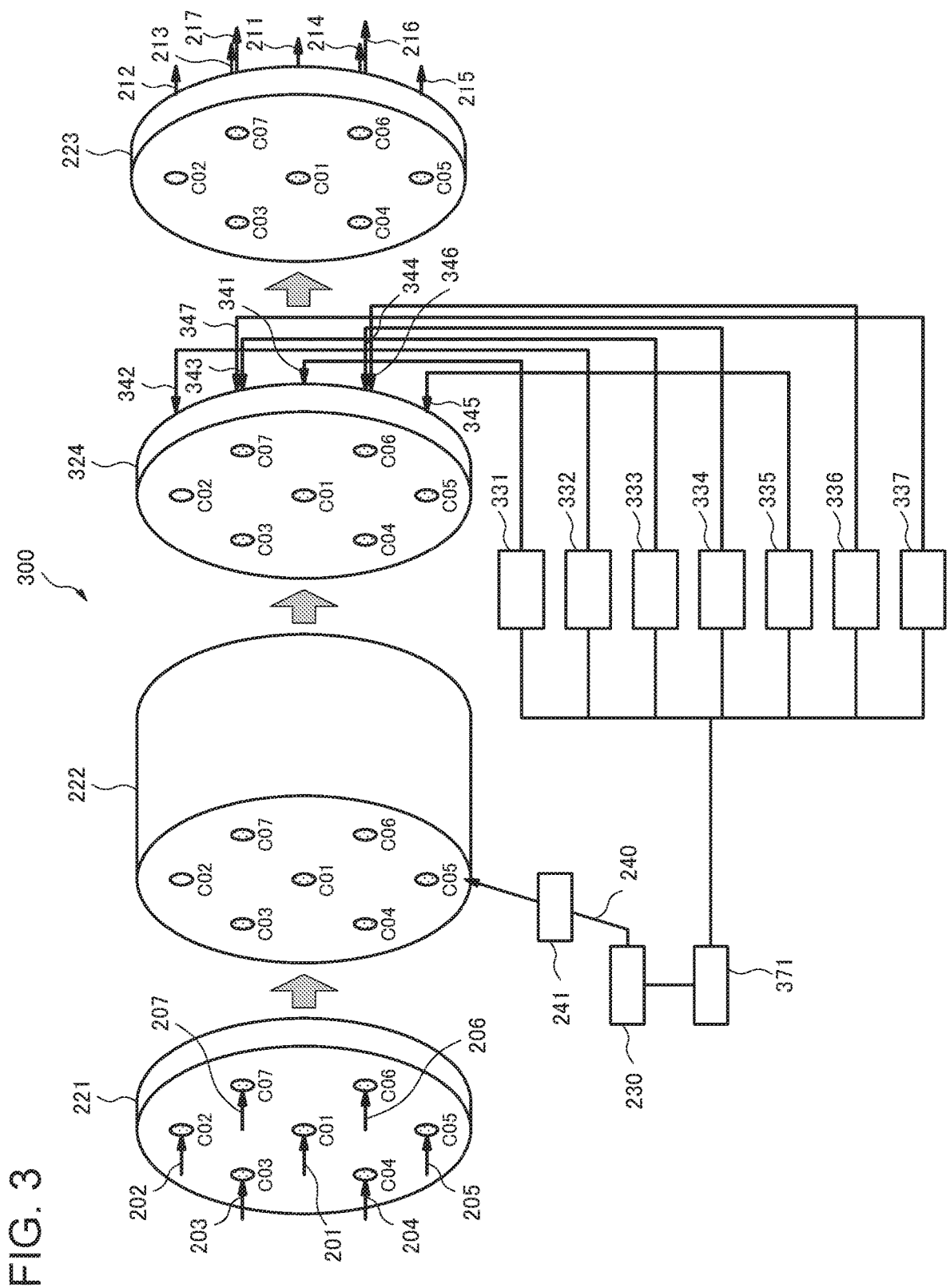
FIG. 3 is a block diagram illustrating a configuration of a multicore optical fiber amplifier according to a third example embodiment of the present invention.

Next, a third example embodiment of the present invention will be described. FIG. 3 illustrates a configuration of a multicore optical fiber amplifier 300 according to the third example embodiment of the present invention. The same constituents as those of the multicore optical fiber amplifier 200 according to the second example embodiment are represented by the same reference signs, and their detailed descriptions may not be repeated.

The multicore optical fiber amplifier 300 according to the present example embodiment includes an amplification optical fiber 222 serving as a multicore optical fiber amplification medium, a clad excitation introduction section 241 serving as an excitation light introduction means, a signal light introduction section 221, and a core excitation light introduction section 324 serving as a control light introduction means.

In an example illustrated in FIG. 3, the amplification optical fiber 222 has a configuration in which a multicore optical fiber including seven cores C01 to C07, for example, is doped with a rare earth element. As the rare earth element, erbium (Er) can be typically used.

The clad excitation introduction section 241 inputs, into a clad of the amplification optical fiber 222, clad excitation light 240 output from a clad excitation light source 230. The signal light introduction section 221 inputs signal light beams 201 to 207 into the respective cores of the amplification optical fiber 222.

The core excitation light introduction section 324 inputs, into the respective cores, core excitation light beams 341 to 347 output from core excitation light sources 331 to 337 serving as excitation light sources. Here, the core excitation light sources 331 to 337 generate core excitation light beams each of which is control light and is used for exciting the amplification optical fiber 222.

The multicore optical fiber amplifier 300 according to the present example embodiment further includes a first control section (first control means) 371 that controls the operations of the clad excitation light source 230 and the core excitation light sources 331 to 337. The first control section 371 controls the clad excitation light source 230 and the core excitation light sources 331 to 337 in such a way as to stop introducing the clad excitation light 240 into the clad, with the core excitation light introduced into only a signal core into which signal light is being introduced among the plurality of cores C01 to C07. That is to say, the first control section 371 controls the clad excitation light source 230 and the core excitation light sources 331 to 337 when inputting signal light into a core with no signal light.

As each of the clad excitation introduction section 241 and the core excitation light introduction section 324, an optical multiplexer such as an optical fiber coupler can be typically used.

FIG. 3 illustrates a configuration including a signal light output section 223 that outputs, from the respective cores, after-propagation signal light beams 211 to 217 each of which is signal light after having been propagated through the amplification optical fiber 222.

Next, the operation of the multicore optical fiber amplifier 300 according to the present example embodiment will be described. Here, a case will be described as an example where the signal light beams 201 to 206 are being inputted into the multicore optical fiber amplifier 300, but the signal light beam 207 is not being inputted, that is, the core C07 is in a state of no signal light.

The first control section 371 included in the multicore optical fiber amplifier 300 puts the excitation light source 230 into an on-state. This causes the excitation light 240 to be inputted into the clad of the amplification optical fiber 222. By this optical excitation, the signal light beams 201 to 206 are amplified.

When it is started in this state to input the signal light beam 207, the first control section 371 puts the core excitation light sources 331 to 336 into on-states, and the core excitation light source 337 into an off-state. Then the first control section 371 puts the clad excitation light source 230 into an off-state temporarily. This prevents the clad excitation light 240 from being inputted into the clad. However, the amplification operation on the signal light beams 201 to 206 is maintained because the core excitation light beams 341 to 346 are being inputted into the respective cores C01 to C06.

After the signal light beam 207 is inputted into the core C07, the first control section 371 puts the clad excitation light source 230 into an on-state again. At this time, the first control section 371 also puts the core excitation light source 337 into an on-state, and controls the optical power of the core excitation light beam 347 and the core excitation light beams 341 to 346, which makes it possible to reduce a difference, between the plurality of cores, in the gain caused by the amplification optical fiber 222.

The above-mentioned operation of the first control section 371 makes it possible to suppress the optical surge effect when starting to input the signal light beam 207.

Next, an optical amplification method using a multicore optical fiber amplification medium according to the present example embodiment will be described.

In the optical amplification method using a multicore optical fiber amplification medium of the present example embodiment, first, signal light is introduced into at least one of a plurality of cores, and the signal light has a wavelength included in the gain band of a multicore optical fiber amplification medium including, in a clad, a plurality of cores doped with a rare earth element. In order to excite the multicore optical fiber amplification medium, excitation light to be introduced into the clad is generated. Control light to be introduced into the plurality of cores is generated. Only when the excitation light is being introduced, the control light is introduced into a non-signal core into which the signal light is not being introduced, among the plurality of cores.

The above-described control light is core excitation light for exciting the multicore optical fiber amplification medium. Then the introduction of the excitation light into the clad is stopped, with the core excitation light being introduced into only a signal core into which the signal light is being introduced among the plurality of cores.

As mentioned above, in the multicore optical fiber amplifier 300 and the optical amplification method using the multicore optical fiber amplification medium of the present example embodiment, the signal light is inputted into the core with no signal light, with the plurality of cores excited together by the excitation light inputted into the clad. At this time, the operation of each excitation light source is controlled. This makes it possible to suppress the optical surge effect. That is to say, it is possible, even when a clad excitation method is used, to suppress the occurrence of an optical surge due to input of signal light into a core with no signal light, without the occurrence of fluctuation in the gain of a core into which signal light is inputted.

Fourth Example Embodiment

Figure 4:
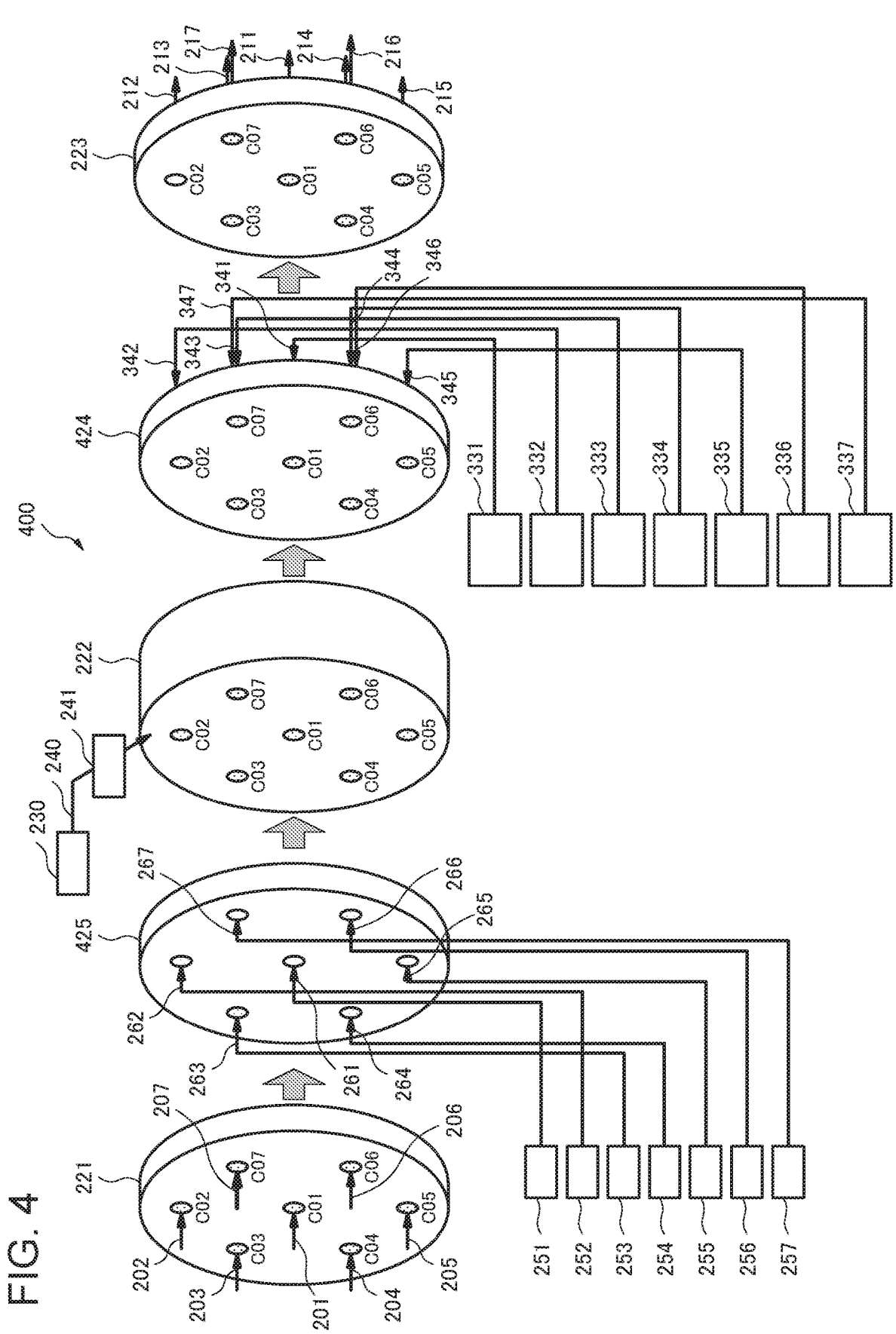
FIG. 4 is a block diagram illustrating a configuration of a multicore optical fiber amplifier according to a fourth example embodiment of the present invention.

Next, a fourth example embodiment of the present invention will be described. FIG. 4 illustrates a configuration of a multicore optical fiber amplifier 400 according to the fourth example embodiment of the present invention. The same constituents as those of the multicore optical fiber amplifier 200 according to the second example embodiment and the multicore optical fiber amplifier 300 according to the third example embodiment are represented by the same reference signs, and their detailed descriptions may not be repeated.

The multicore optical fiber amplifier 400 according to the present example embodiment includes an amplification optical fiber 222 serving as a multicore optical fiber amplification medium, a clad excitation introduction section 241 serving as an excitation light introduction means, a signal light introduction section 221, and a signal light output section 223.

In an example illustrated in FIG. 4, the amplification optical fiber 222 has a configuration in which a multicore optical fiber including seven cores C01 to C07, for example, is doped with a rare earth element. As the rare earth element, erbium (Er) can be typically used.

The clad excitation introduction section 241 inputs, into a clad of the amplification optical fiber 222, clad excitation light 240 output from a clad excitation light source 230. The signal light introduction section 221 inputs signal light beams 201 to 207 into the respective cores of the amplification optical fiber 222. The signal light output section 223 outputs, from the respective cores, after-propagation signal light beams 211 to 217 each of which is signal light after having been propagated through the amplification optical fiber 222.

The multicore optical fiber amplifier 400 further includes dummy light sources 251 to 257 serving as light sources for dummy light, core excitation light sources 331 to 337, and a control light introduction section (control light introduction means). The dummy light sources 251 to 257 generate dummy light beams 261 to 267 each of which is control light with a wavelength included in the gain band of the amplification optical fiber 222. The core excitation light sources 331 to 337 generate core excitation light beams 341 to 347 each of which is control light and is used for exciting the amplification optical fiber 222. The control light introduction section is configured to introduce the dummy light beams 261 to 267 and the core excitation light beams 341 to 347 into the plurality of cores, respectively.

Specifically, as illustrated in FIG. 4, the control light introduction section can be configured to include a first control light introduction section (first control light introduction means) 425 and a second control light introduction section (second control light introduction means) 424, for example. Here, the first control light introduction section 425 is configured to introduce the dummy light beams 261 to 267 into the plurality of cores C01 to C07, respectively. The second control light introduction section 424 is configured to introduce the core excitation light beams 341 to 347 into the plurality of cores C01 to C07, respectively. As each of the first control light introduction section 425 and the second control light introduction section 424, an optical multiplexer such as an optical fiber coupler can be typically used.

Next, the operation of the multicore optical fiber amplifier 400 according to the present example embodiment will be described. Here, a case will be described as an example where the signal light beams 201 to 206 are being inputted into the multicore optical fiber amplifier 400, but the signal light beam 207 is not being inputted, that is, the core C07 is in a state of no signal light.

The multicore optical fiber amplifier 400 puts the excitation light source 230 into an on-state. This causes the excitation light 240 to be inputted into the clad of the amplification optical fiber 222. By this optical excitation, the signal light beams 201 to 206 are amplified. At this time, the multicore optical fiber amplifier 400 puts the core excitation light sources 331 to 336 into an on-state, and controls the optical power of the core excitation light beams 341 to 346, which makes it possible to reduce a difference, between the plurality of cores, in the gain caused by the amplification optical fiber 222.

The dummy light beam 267 from the dummy light source 257 is being inputted into at least the core C07 among the cores C01 to C07. That is to say, the dummy light beam 267 from the dummy light source 257 is inputted into the core C07 with no signal light and amplified; therefore, it is possible to avoid having strong population inversion formed. This makes it possible to suppress the production of the optical surge effect when it is started in this state to input the signal light beam 207 into the core C07.

At this time, each gain of the cores C01 to C06 into which the signal light beams 201 to 206 are being introduced does not fluctuate and can be kept constant because the excitation light 240 and the core excitation light beams 341 to 346 are being introduced.

After the signal light beam 207 has been inputted into the core C07, the dummy light source 257 is put into an off-state. At this time, the core excitation light source 337 is put into an on-state, and the optical power of the core excitation light 347 is also controlled, which makes it possible to reduce a difference, between the plurality of cores, in the gain caused by the amplification optical fiber 222.

As described above, the multicore optical fiber amplifier 400 according to the present example embodiment avoids forming a strong population inversion state by using the dummy light when the signal light is inputted into the core with no signal light, with the plurality of cores excited together by the excitation light inputted into the clad. This causes the optical surge effect to be suppressed. That is to say, according to the multicore optical fiber amplifier 400 of the present example embodiment, it is possible, even when a clad excitation method is used, to suppress the occurrence of an optical surge due to input of signal light into a core with no signal light, without the occurrence of fluctuation in the gain of a core into which signal light is inputted.

Figure 5:
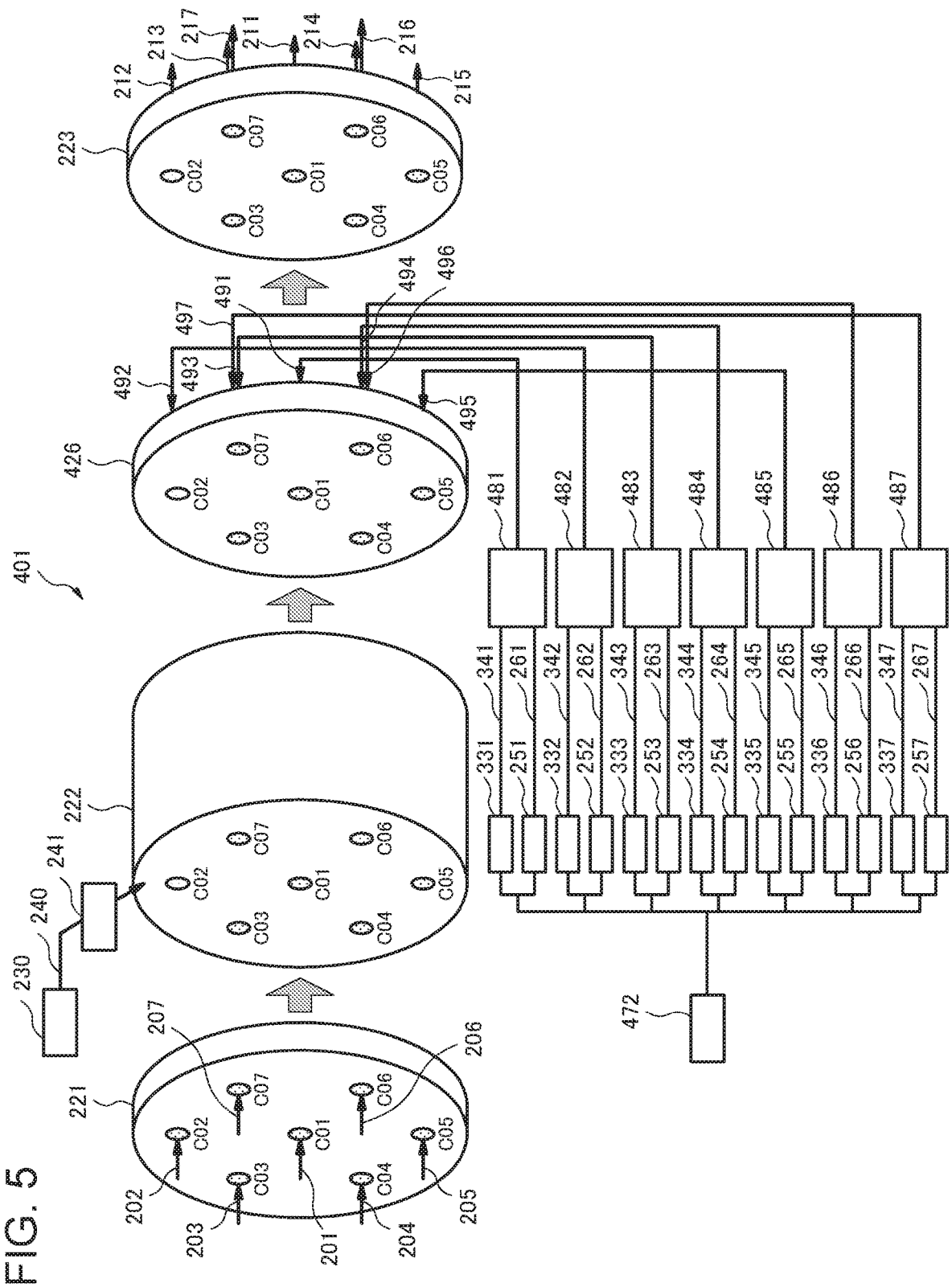
FIG. 5 is a block diagram illustrating another configuration of the multicore optical fiber amplifier according to the fourth example embodiment of the present invention.

In the above description, the control light introduction section is configured to include the first control light introduction section 425 and the second control light introduction section 424. However, the configuration is not limited to this; as a multicore optical fiber amplifier 401 illustrated in FIG. 5, the multicore optical fiber amplifier may be configured to include a piece of synthesized-control-light introduction section 426 serving as a control light introduction section, instead of the first control light introduction section 425 and the second control light introduction section 424. The multicore optical fiber amplifier 401 further includes synthesis sections 481 to 487 and a light source control section 472.

The synthesis sections 481 to 487 combine the dummy light beams 261 to 267 and the core excitation light beams 341 to 347, and generate synthesized control light beams 491 to 497, respectively. Each of the synthesis sections 481 to 487 is typically composed of a multiplexer. The synthesized-control-light introduction section 426 is configured to introduce the synthesized control light beams 491 to 497 into the plurality of cores C01 to C07, respectively. As the synthesized-control-light introduction section 426, an optical multiplexer such as an optical fiber coupler can be typically used. As mentioned above, the light source control section 472 performs on-off control on the core excitation light sources 331 to 337 and the dummy light sources 251 to 257, depending on the presence or absence of the signal light beams 201 to 207 inputted into the cores C01 to C07.

The multicore optical fiber amplifier 401 having such a configuration can also suppress the optical surge effect by performing an operation similar to that of the above-mentioned multicore optical fiber amplifier 400. Furthermore, the multicore optical fiber amplifier 401 is configured to use the synthesized-control-light introduction section 426 in common, in order to input each of the dummy light beams 261 to 267 and the core excitation light beams 341 to 347 into the amplification optical fiber 222. Consequently, according to the multicore optical fiber amplifier 401, it becomes possible to simplify a device structure and become miniaturized.

Next, an optical amplification method using a multicore optical fiber amplification medium according to the present example embodiment will be described.

In the optical amplification method using a multicore optical fiber amplification medium of the present example embodiment, first, signal light is introduced into at least one of a plurality of cores, and the signal light has a wavelength included in the gain band of a multicore optical fiber amplification medium including, in a clad, a plurality of cores doped with a rare earth element. In order to excite the multicore optical fiber amplification medium, excitation light to be introduced into the clad is generated. Control light to be introduced into the plurality of cores is generated. Only when the excitation light is being introduced, the control light is introduced into a non-signal core into which the signal light is not being introduced, among the plurality of cores.

The control light includes dummy light having a wavelength included in the gain band of the multicore optical fiber amplification medium, and core excitation light for exciting the multicore optical fiber amplification medium. Here, the dummy light is introduced into at least a non-signal core into which the signal light is not being introduced, among the plurality of cores, and the core excitation light is introduced into a signal core into which the signal light is being introduced among the plurality of cores. The optical power of the core excitation light is controlled in such a way as to reduce a difference, between the plurality of cores, in the gain caused by the multicore optical fiber amplification medium.

As mentioned above, in the multicore optical fiber amplifier 400 or 401, and the optical amplification method using the multicore optical fiber amplification medium of the present example embodiment, the signal light is inputted into the core with no signal light, with the plurality of cores excited together by the excitation light inputted into the clad. At this time, it is avoided to form a strong population inversion state by using the dummy light, which makes it possible to suppress the optical surge effect. That is to say, according to the multicore optical fiber amplifier 400 of the present example embodiment, it is possible, even when a clad excitation method is used, to suppress the occurrence of an optical surge due to input of signal light into a core with no signal light, without the occurrence of fluctuation in the gain of a core into which signal light is inputted.

Fifth Example Embodiment

Figure 6:
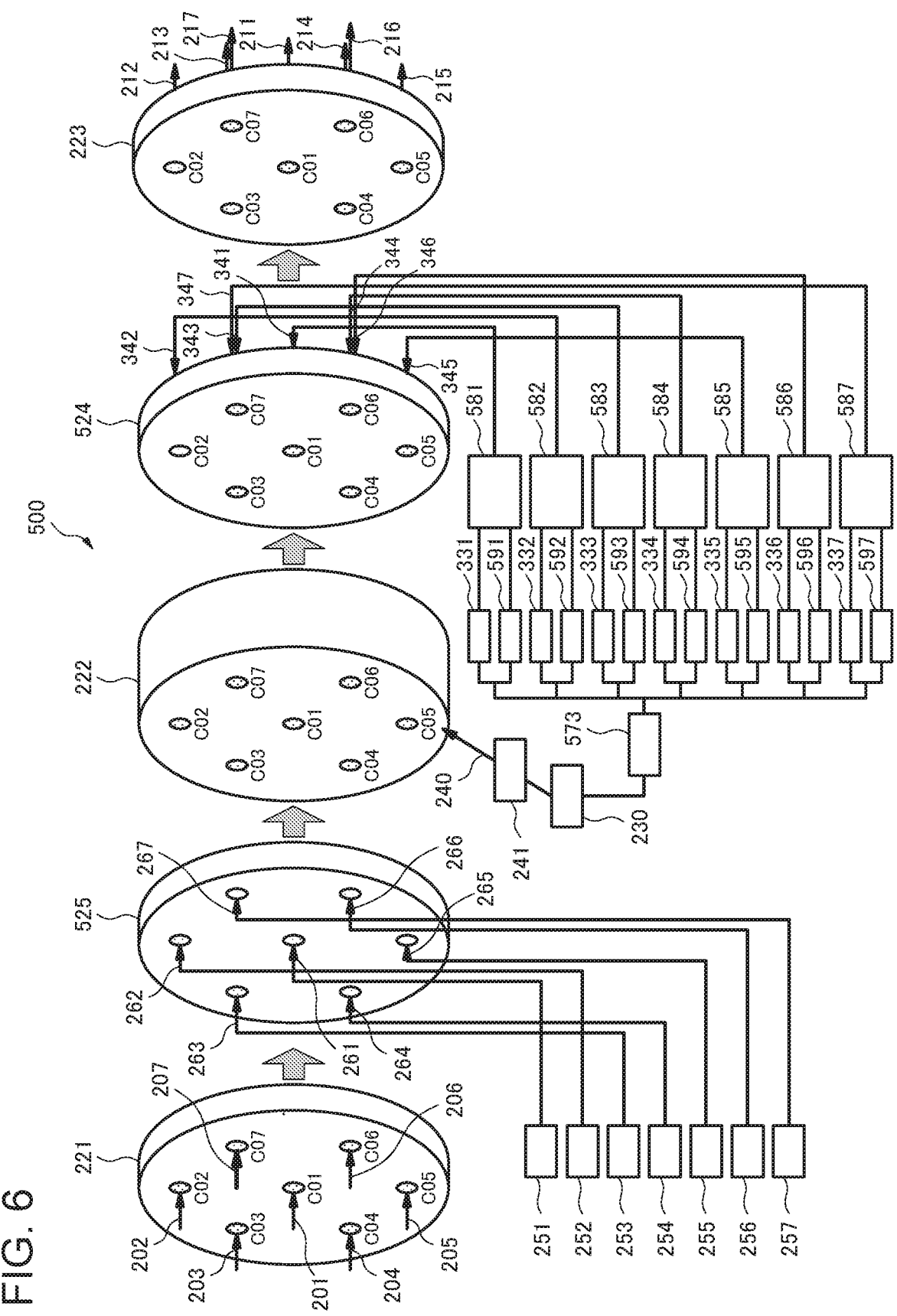
FIG. 6 is a block diagram illustrating a configuration of a multicore optical fiber amplifier according to a fifth example embodiment of the present invention.
Figure 7A:
FIG. 7A is a diagram to describe an optical surge effect that could arise in an optical fiber amplifier, and a diagram illustrating a waveform of light inputted into the optical fiber amplifier.
Figure 7B:
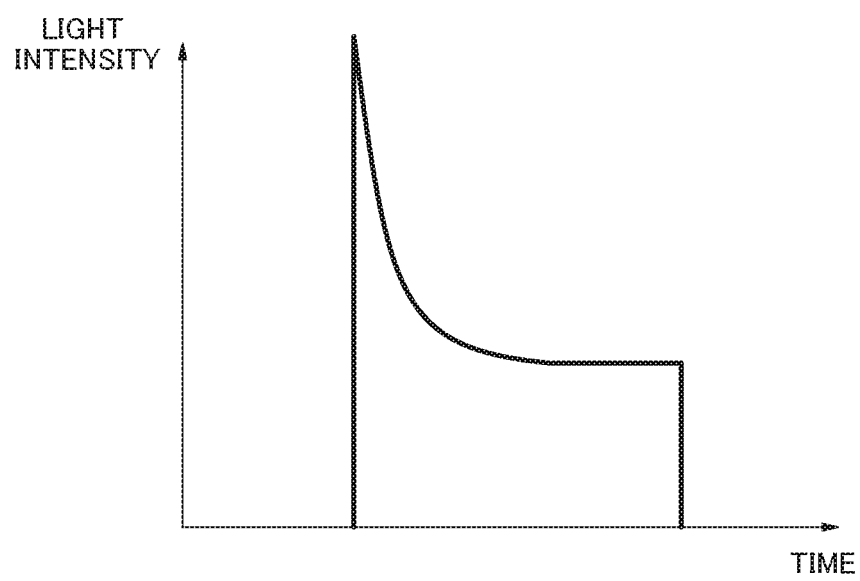
FIG. 7B is a diagram illustrating the optical surge effect that could arise in an optical fiber amplifier, and a diagram illustrating a waveform of light output from the optical fiber amplifier.

Next, a fifth example embodiment of the present invention will be described. FIG. 6 illustrates a configuration of a multicore optical fiber amplifier 500 according to the fifth example embodiment of the present invention. The same constituents as those of the multicore optical fiber amplifier 200 according to the second example embodiment and the multicore optical fiber amplifier 300 according to the third example embodiment are represented by the same reference signs, and their detailed descriptions may not be repeated.

The multicore optical fiber amplifier 500 according to the present example embodiment includes an amplification optical fiber 222 serving as a multicore optical fiber amplification medium, a clad excitation introduction section 241 serving as an excitation light introduction means, a signal light introduction section 221, and a signal light output section 223.

In an example illustrated in FIG. 6, the amplification optical fiber 222 has a configuration in which a multicore optical fiber including seven cores C01 to C07, for example, is doped with a rare earth element. As the rare earth element, erbium (Er) can be typically used.

The clad excitation introduction section 241 inputs, into a clad of the amplification optical fiber 222, clad excitation light 240 output from a clad excitation light source 230. The signal light introduction section 221 inputs signal light beams 201 to 207 into the respective cores of the amplification optical fiber 222. The signal light output section 223 outputs, from the respective cores, after-propagation signal light beams 211 to 217 each of which is signal light after having been propagated through the amplification optical fiber 222.

The multicore optical fiber amplifier 500 further includes dummy light sources 251 to 257 serving as light sources for dummy light, core excitation light sources 331 to 337, and a control light introduction section (control light introduction means). The dummy light sources 251 to 257 generate dummy light beams 261 to 267 each of which is control light with a wavelength included in the gain band of the amplification optical fiber 222. The core excitation light sources 331 to 337 generate core excitation light beams 341 to 347 each of which is control light and is used for exciting the amplification optical fiber 222. The control light introduction section is configured to introduce the dummy light beams 261 to 267 and the core excitation light beams 341 to 347 into the plurality of cores, respectively.

The control light introduction section is configured to include a first control light introduction section (first control light introduction means) 525 and a second control light introduction section (second control light introduction means) 524. Here, the first control light introduction section 525 is configured to introduce the dummy light beams 261 to 267 into the plurality of cores C01 to C07, respectively. The second control light introduction section 524 is configured to introduce the core excitation light beams 341 to 347 into the plurality of cores C01 to C07, respectively. As each of the first control light introduction section 525 and the second control light introduction section 524, an optical multiplexer such as an optical fiber coupler can be typically used.

In the multicore optical fiber amplifier 500 according to the present example embodiment, the first control light introduction section 525 is located on the input side of the signal light beams 201 to 207 with respect to the amplification optical fiber 222, and the second control light introduction section 524 is located on the output side. Here, the second control light introduction section 524 includes a dummy light separation section (dummy light separation means) configured to separate after-propagation dummy light that is dummy light after having been propagated through the amplification optical fiber 222.

The multicore optical fiber amplifier 500 further includes light intensity monitors (monitoring means) 591 to 597 each of which monitors a light intensity of the after-propagation dummy light, demultiplexing sections 581 to 587 that introduce the after-propagation dummy light into the light intensity monitors 591 to 597, and a second control section (second control means) 573. Here, the second control section 573 controls the output optical power of the clad excitation light source 230 and the core excitation light sources 331 to 337 based on the monitored light intensities in such a way as to reduce a difference, between the plurality of cores C01 to C07, in the gain caused by the amplification optical fiber 222.

Next, the operation of the multicore optical fiber amplifier 500 according to the present example embodiment will be described. Here, a case will be described as an example where the signal light beams 201 to 206 are being inputted into the multicore optical fiber amplifier 500, but the signal light beam 207 is not being inputted, that is, the core C07 is in a state of no signal light.

The second control section 573 included in the multicore optical fiber amplifier 500 puts the excitation light source 230 into an on-state. This causes the excitation light 240 to be inputted into the clad of the amplification optical fiber 222. By this optical excitation, the signal light beams 201 to 206 are amplified. At this time, the second control section 573 puts the core excitation light sources 331 to 336 into an on-state, and controls the optical power of the core excitation light beams 341 to 346, which makes it possible to reduce a difference, between the plurality of cores, in the gain caused by the amplification optical fiber 222.

The dummy light beams 261 to 267 from the dummy light sources 251 to 257 are being inputted into the cores C01 to C07. That is to say, the dummy light beam 267 from the dummy light source 257 is inputted into the core C07 with no signal light and amplified; therefore, it is possible to avoid having strong population inversion formed. This makes it possible to suppress the production of the optical surge effect when it is started in this state to input the signal light beam 207 into the core C07.

At this time, each gain of the cores C01 to C06 into which the signal light beams 201 to 206 are being introduced does not fluctuate and can be kept constant because the excitation light 240 and the core excitation light beams 341 to 346 are being introduced.

The after-propagation dummy light, which has been propagated through the amplification optical fiber 222 and has reached the second control light introduction section 524, is separated by the dummy light separation section included in the second control light introduction section 524, and introduced into the light intensity monitors 591 to 597 through the demultiplexing sections 581 to 587. At this time, the second control section 573 controls the clad excitation light source 230 and the core excitation light sources 331 to 337 based on the monitored light intensities, which makes it possible to reduce a difference in the gain between the cores C01 to C07.

As mentioned above, the multicore optical fiber amplifier 500 according to the present example embodiment avoids forming a strong population inversion state by using the dummy light when the signal light is inputted into the core with no signal light, with the plurality of cores excited together by the excitation light inputted into the clad. This causes the optical surge effect to be suppressed. That is to say, according to the multicore optical fiber amplifier 500 of the present example embodiment, it is possible, even when a clad excitation method is used, to suppress the occurrence of an optical surge due to input of signal light into a core with no signal light, without the occurrence of fluctuation in the gain of a core into which signal light is inputted.

Furthermore, the multicore optical fiber amplifier 500 is configured to use the second control light introduction section 524 in common, in order to input the core excitation light beams 341 to 347 into the amplification optical fiber 222 and separate the amplified after-propagation dummy light. Consequently, according to the multicore optical fiber amplifier 500, it becomes possible to simplify a device structure and become miniaturized.

The above-mentioned respective example embodiments are described using, as an example, the amplification optical fiber 222 in which the multicore optical fiber including the seven cores C01 to C07 is doped with the rare earth element. However, the number of cores is not limited to this, and advantageous effects can be achieved that are similar to those of the multicore optical fiber amplifier according to each of the above-mentioned example embodiments, even though the number of cores differs from the above.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100, 200, 300, 400, 401, 500 Multicore optical fiber amplifier
110 Multicore optical fiber amplification medium
111 Core
112 Clad
120 Signal light introduction section
130 Excitation light introduction section
140 Control light introduction section
201 to 207 Signal light beam
211 to 217 After-propagation signal light beam
221 Signal light introduction section
222 Amplification optical fiber
223 Signal light output section
225 Dummy light introduction section
230 Clad excitation light source
240 Clad excitation light
241 Clad excitation introduction section
251 to 257 Dummy light source
261 to 267 Dummy light beam
324 Core excitation light introduction section
331 to 337 Core excitation light source
341 to 347 Core excitation light beam
371 First control section
424, 524 Second control light introduction section
425, 525 First control light introduction section
426 Synthesized-control-light introduction section
472 Light source control section
481 to 487 Synthesis section
491 to 497 Synthesized control light beam
573 Second control section
581 to 587 Demultiplexing section
591 to 597 Light intensity monitor

The invention claimed is:
1. A multicore optical fiber amplifier, comprising:
a multicore optical fiber amplification medium including, in a clad, a plurality of cores doped with a rare earth element;

a signal light introduction section configured to introduce, into at least one of the plurality of cores but not into a non-signal core of the plurality of cores, signal light with a wavelength included in a gain band of the multicore optical fiber amplification medium;

an excitation light introduction section configured to introduce, into the clad, excitation light for exciting the multicore optical fiber amplification medium; and a control light introduction section configured to introduce control light into each of the plurality of cores, wherein the control light introduction section introduces the control light into the non-signal core only when the excitation light is being introduced.

2. The multicore optical fiber amplifier according to claim 1, wherein the control light is dummy light having a wavelength included in a gain band of the multicore optical fiber amplification medium.

3. The multicore optical fiber amplifier according to claim 1, further comprising an excitation light source configured to generate the excitation light, a core excitation light source configured to generate core excitation light that is the control light and is used for exciting the multicore optical fiber amplification medium, and a first control section configured to control operations of the excitation light source and the core excitation light source, wherein the first control section controls the excitation light source and the core excitation light source to stop introduction of the excitation light into the clad, such that the core excitation light is introduced into only a signal core of the plurality of cores into which the signal light is introduced.

4. The multicore optical fiber amplifier according to claim 1, further comprising a light source for dummy light configured to generate dummy light that is the control light having a wavelength included in a gain band of the multicore optical fiber amplification medium, and a core excitation light source configured to generate core excitation light that is the control light and is used for exciting the multicore optical fiber amplification medium, wherein the control light introduction section is configured to introduce the dummy light and the core excitation light into each of the plurality of cores.

5. The multicore optical fiber amplifier according to claim 4, further comprising a synthesis section configured to combine the dummy light and the core excitation light, and generate synthesized control light, wherein the control light introduction section is configured to introduce the synthesized control light into each of the plurality of cores.

6. The multicore optical fiber amplifier according to claim 4, wherein the control light introduction section includes a first control light introduction section and a second control light introduction section, the first control light introduction section is configured to introduce the dummy light into each of the plurality of cores, and the second control light introduction section is configured to introduce the core excitation light into each of the plurality of cores.

7. The multicore optical fiber amplifier according to claim 6, wherein the first control light introduction section is located on an input side of the signal light with respect to the multicore optical fiber amplification medium, the second control light introduction section is located on an output side of the signal light with respect to the multicore optical fiber amplification medium, the second control light introduction section includes a dummy light separation section configured to separate after-propagation dummy light that is the dummy light after having been propagated through the multicore optical fiber amplification medium, and the multicore optical fiber amplifier further includes a monitor configured to monitor a light intensity of the after-propagation dummy light, an excitation light source configured to generate the excitation light, and a second control section configured to control output optical power of the excitation light source and the core excitation light source based on the light intensity in such a way as to reduce a difference, between the plurality of cores, in gain caused by the multicore optical fiber amplification medium.

8. An optical amplification method using a multicore optical fiber amplification medium, comprising:

introducing signal light into at least one of a plurality of cores but not into a non-signal core of the plurality of cores, the signal light having a wavelength included in a gain band of the multicore optical fiber amplification medium including, in a clad, the plurality of cores doped with a rare earth element;

generating excitation light to be introduced into the clad in order to excite the multicore optical fiber amplification medium;

generating control light to be introduced into the plurality of cores; and introducing the control light into the non-signal core only when the excitation light is being introduced.

9. The optical amplification method using a multicore optical fiber amplification medium according to claim 8, further comprising generating core excitation light that is the control light for exciting the multicore optical fiber amplification medium, and stopping introduction of the excitation light into the clad, such that the core excitation light is introduced into only a signal core of the plurality of cores into which the signal light is introduced.

10. The optical amplification method using a multicore optical fiber amplification medium according to claim 8, further comprising generating dummy light that is the control light and has a wavelength included in a gain band of the multicore optical fiber amplification medium, generating core excitation light that is the control light and is used for exciting the multicore optical fiber amplification medium, introducing the dummy light into at least a non-signal core into which the signal light is not being introduced, among the plurality of cores, introducing the core excitation light into a signal core into which the signal light is being introduced among the plurality of cores, and controlling optical power of the core excitation light in such a way as to reduce a difference, between the plurality of cores, in gain caused by the multicore optical fiber amplification medium.

* * * * *